(12) United States Patent
Ono

(10) Patent No.: US 9,755,564 B2
(45) Date of Patent: Sep. 5, 2017

(54) CONTROLLER FOR MOTOR GENERATOR

(71) Applicant: Toyota Jidosha Kabushiki Kaisha, Toyota-shi, Aichi-ken (JP)

(72) Inventor: Toshikazu Ono, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 98 days.

(21) Appl. No.: 14/592,357

(22) Filed: Jan. 8, 2015

(65) Prior Publication Data

US 2015/0207448 A1 Jul. 23, 2015

(30) Foreign Application Priority Data

Jan. 20, 2014 (JP) .................................. 2014-008146

(51) Int. Cl.
*H02P 27/08* (2006.01)
*H02P 9/48* (2006.01)
*B60L 11/00* (2006.01)

(52) U.S. Cl.
CPC .............. *H02P 27/085* (2013.01); *H02P 9/48* (2013.01); *H02P 2201/09* (2013.01)

(58) Field of Classification Search
None
See application file for complete search history.

(56) References Cited

U.S. PATENT DOCUMENTS

| | | | |
|---|---|---|---|
| 6,342,770 B1 | 1/2002 | Stephan et al. | |
| 8,095,255 B2* | 1/2012 | Ebuchi | B60K 6/365 |
| | | | 180/65.21 |
| 2004/0061461 A1 | 4/2004 | Tajima et al. | |
| 2009/0121669 A1* | 5/2009 | Hanada | B60L 11/1807 |
| | | | 318/504 |
| 2009/0237018 A1* | 9/2009 | Nakagawa | G01B 7/30 |
| | | | 318/400.04 |
| 2012/0139460 A1* | 6/2012 | Senkou | H02P 21/0096 |
| | | | 318/400.02 |
| 2013/0002174 A1* | 1/2013 | Okamura | B60L 15/08 |
| | | | 318/139 |

(Continued)

FOREIGN PATENT DOCUMENTS

| | | |
|---|---|---|
| DE | 19936755 A1 | 2/2001 |
| DE | 102008052144 A1 | 4/2010 |
| DE | 102012102868 A1 | 10/2013 |

(Continued)

*Primary Examiner* — Bentsu Ro
*Assistant Examiner* — Said Bouziane
(74) *Attorney, Agent, or Firm* — Dinsmore & Shohl LLP

(57) ABSTRACT

An alternating current that is to be supplied to a motor generator is controlled by controlling an inverter using a target output of the motor generator and a result of detection of an angle-of-rotation sensor, and a voltage step-up is controlled in accordance with the target output of the motor generator. During operation of the motor generator, a stepped-up voltage obtained through the step-up converter is set to be higher (S13) when learning of the point of origin of the angle-of-rotation sensor has yet to be completed (S11), than when learning of the point of origin of the angle-of-rotation sensor has been completed. This eliminates malfunctions occurring in motor operation when learning of the point of origin of the angle-of-rotation sensor has yet to be completed.

8 Claims, 5 Drawing Sheets

(56) References Cited

U.S. PATENT DOCUMENTS

2013/0257326 A1    10/2013   Winker et al.
2014/0062359 A1*   3/2014   Oyobe ................ H02P 21/0025
                                                                        318/400.13

FOREIGN PATENT DOCUMENTS

| JP | 2004-129359 A | 4/2004 |
| JP | 2007-306658 A | 11/2007 |
| JP | 2012-120360 A | 6/2012 |

* cited by examiner

US 9,755,564 B2

CONTROLLER FOR MOTOR GENERATOR

PRIORITY INFORMATION

The entire disclosure of Japanese Patent Application No. 2014-008146, filed on Jan. 20, 2014, including the specification, claims, drawings, and abstract, is incorporated herein by reference in its entirety.

TECHNICAL FIELD

The present invention relates to controlling a motor generator before completion of learning of the position of the point of origin of an angle-of-rotation sensor for detecting an angle of rotation of the motor generator.

BACKGROUND ART

Conventionally, electric vehicles (EV) or hybrid electric vehicles (HV) control electric power that is to be supplied from an inverter to a motor generator for driving the vehicle to cause an output torque from the motor generator to conform to a target torque determined based on, for example, an amount of depression of an accelerator pedal.

To control the inverter in this manner, it is necessary to detect the state of rotation of the motor generator, or, in other words, an angle of rotation of the motor generator (an angle of rotation of a rotor). Resolvers are widely used for the detection of an angle of rotation of the motor generator. The inverter is controlled in accordance with an output from a resolver, and in turn, the phase of an alternating current that is to be supplied to the motor generator is controlled.

The resolver detects, by means of a coil, a magnetic field that is generated in response to the rotation of the motor generator to detect the angle of rotation of the motor generator, or, in other words, the phase of rotation of the rotor. Therefore, a deviation in the position of the point of origin of the resolver occurring due to, for example, an error in the position of attachment of the resolver results in inaccurate detection of the angle of rotation of the motor generator, and disables appropriate control of electric current that is to be supplied to the motor generator.

JP 2004-129359 A discloses correcting an error in the point of origin of a resolver based on an output from the resolver while a motor generator is being rotated. Performing such learning to correct an error in the point of origin of a resolver can eliminate problems in actual operation.

The learning-based correction of an error in the point of origin of a resolver is often performed in a factory before shipment, but may also be performed later during repair or inspection at a dealer. Further, it can also be performed as desired during actual driving.

During or before such learning, or, in other words, when learning has yet to be completed, the position of the point of origin of the resolver is inaccurate. As a result, the output from the resolver is incorrect, and, when the motor generator is controlled, the output torque from the motor generator becomes too high or too low. In particular, when the motor generator is controlled in rectangular wave control mode, a deviation in the point of origin of the resolver causes a significant influence.

SUMMARY

An object of the present invention is to appropriately control a motor generator even before completion of learning an error in the point of origin of an angle-of-rotation sensor such as a resolver.

According to one aspect of the present invention, during operation of a motor generator, a control unit sets an output voltage (stepped-up voltage) obtained through a step-up converter to be higher when learning of the point of origin of the angle-of-rotation sensor has yet to be completed, than when learning of the point of origin of the angle-of-rotation sensor has been completed.

Employing such a structure can eliminate malfunctions occurring in motor operation when learning of the point of origin of an angle-of-rotation sensor has yet to be completed.

BRIEF DESCRIPTION OF THE DRAWINGS

Preferred embodiments of the present invention will be described in detail by reference to the following figures, wherein.

DETAILED DESCRIPTION

Embodiments of the present invention will be described below with reference to the drawings. The present invention is not limited to the embodiments described herein.

Figure 1:
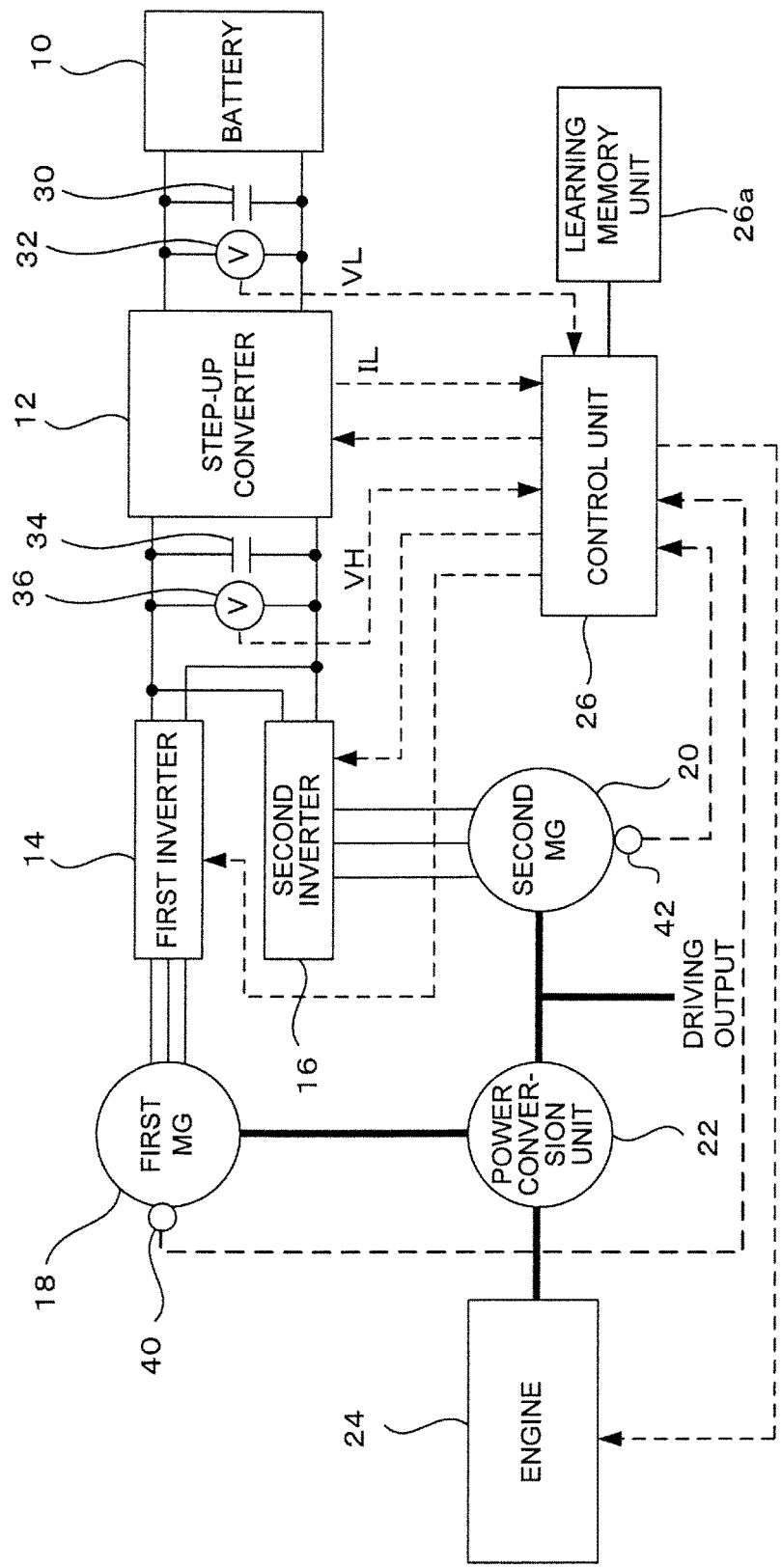
FIG. 1 is a block diagram illustrating a structure of important components of a hybrid electric vehicle.

FIG. 1 is a schematic block diagram illustrating a drive system of a hybrid electric vehicle. A direct current output from a battery 10 is stepped up by a step-up converter 12, and then is supplied to a first inverter 14 and a second inverter 16. A first MG (motor generator) 18 for power generation is connected to the first inverter 14, and a second MG (motor generator) 20 for driving is connected to the second inverter 16.

Output shafts of the first MG 18 and the second MG 20 are connected to a power conversion unit 22, and an output shaft of an engine 24 is also connected to the power conversion unit 22. The rotation of the output shaft connecting between the power conversion unit 22 and the second MG 20 is transmitted to the driving shaft of the vehicle as a driving output, and the output from the power conversion unit 22 and/or the second MG 20 is transmitted to the wheels to cause the hybrid electric vehicle to travel.

The power conversion unit 22 is composed of, for example, a planetary gear mechanism, and controls power transmission between the first MG 18, the second MG 20, and the engine 24. The engine 24 is basically used as a power output source, and the output from the engine 24 is transmitted to the first MG 18 through the power conversion unit 22. With this structure, the first MG 18 generates power using the output from the engine 24, and the resulting generated power is charged to the battery 10 through the first inverter 14 and the step-up converter 12. The output from the engine 24 is transmitted to the driving shaft through the power conversion unit 22, and the vehicle travels using the output from the engine 24. In FIG. 1, the electric power transmission system is indicated by ordinary solid lines, the mechanical power transmission system is indicated by bold solid lines, and the signal transmission system (the control system) is indicated by dashed lines.

The battery 10 has a capacitor 30 for smoothing the output voltage from the battery 10 at its output side, and has a pre-step-up voltage sensor 32 for measuring a voltage across the capacitor 30 (pre-step-up voltage VL). The step-up converter 12 has a capacitor 34 for smoothing the output voltage at its output side, and has a stepped-up voltage sensor 36 for measuring a voltage across the capacitor 34, or, in other words, an input voltage to the first and second inverters 14 and 16 (stepped-up voltage VH). The pre-step-up voltage VL detected by the pre-step-up voltage sensor 32 and the stepped-up voltage VH detected by the stepped-up voltage sensor 36 are supplied to a control unit 26.

The first MG 18 and the second MG 20 respectively have a first resolver 40 and a second resolver 42 for detecting the angle of rotation (phase of rotation) as an angle-of-rotation sensor.

Figure 2:
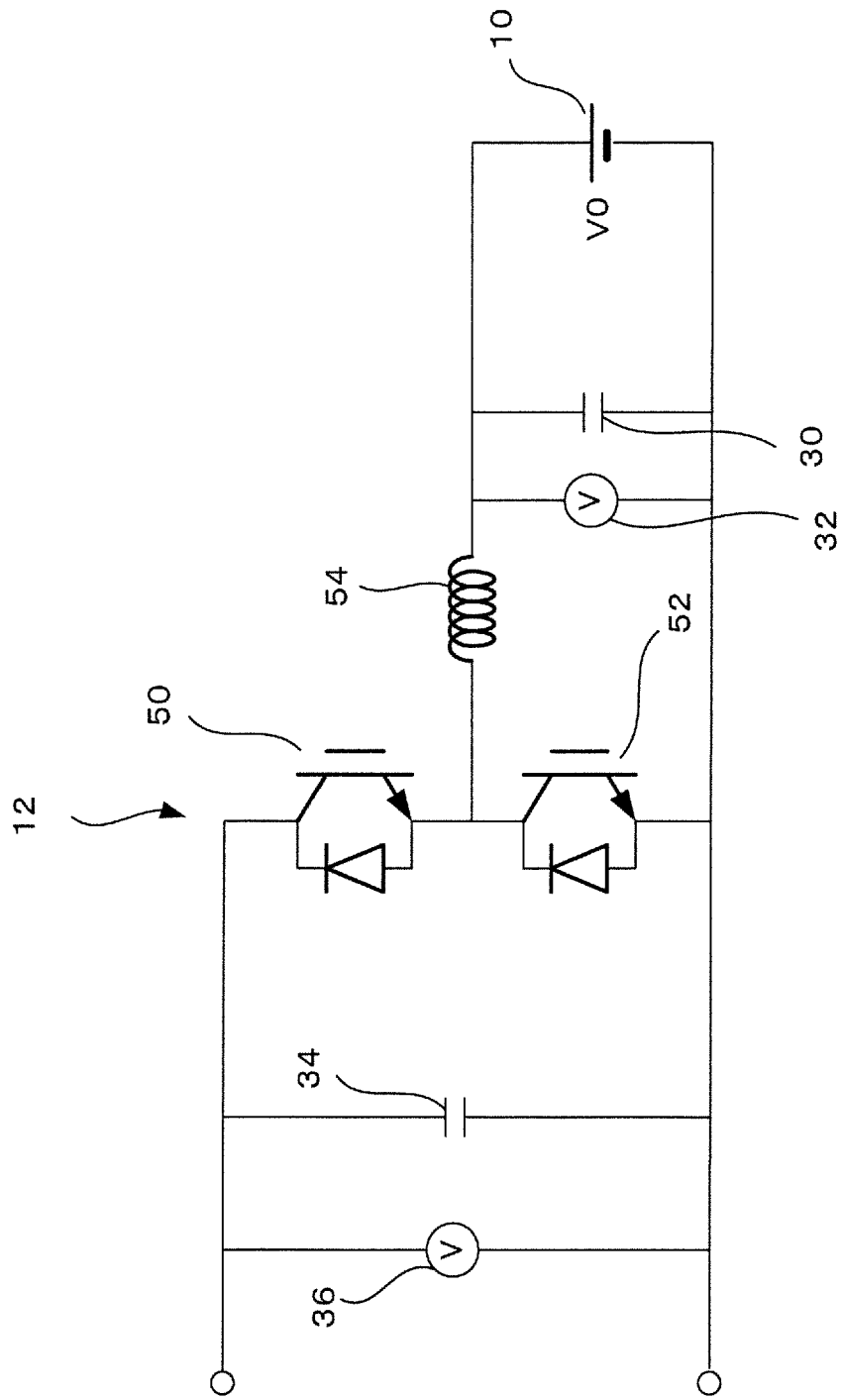
FIG. 2 illustrates a structure of a step-up converter.

FIG. 2 illustrates an internal structure of the step-up converter 12. The step-up converter 12 includes two serially connected switching elements 50 and 52, and one reactor 54 connected to an intermediate point between the switching elements 50 and 52. The switching elements 50 and 52 are each composed of a transistor such as an IGBT, and a diode through which a current flows in a reverse direction to that in the transistor.

One end of the reactor 54 is connected to a positive electrode of the battery 10, and another end of the reactor 54 is connected to the intermediate point between the switching elements 50 and 52. The transistor of the switching element 50 has a collector connected to a positive electrode bus bar for the first and second inverters 14 and 16, and has an emitter connected to a collector of the transistor of the switching element 52. The transistor of the switching element 52 has an emitter connected to a negative electrode of the battery 10, and to a negative electrode bus bar for the first and second inverters 14 and 16.

The control unit 26 controls the first and second inverters 14 and 16 and driving of the engine 24 in accordance with, for example, a target torque determined based on an amount of depression of an accelerator pedal or the speed of the vehicle to control the output to the driving shaft. The control unit 26 also controls driving of the engine 24 and switching of the first inverter 14 in accordance with a state of charge (SOC) of the battery to control charging of the battery 10. To reduce the speed of the vehicle, the control unit 26 controls the second inverter 16 to cause the second MG 20 to perform regenerative braking, so that the battery 10 is charged by the resulting regenerative power. Alternatively, regenerative braking may be performed by the first MG 18. The control unit 26 also controls switching of the switching elements 50 and 52 of the step-up converter 12 to control the stepped-up voltage VH to its target value.

The control unit 26 converts motor currents flowing through respective phases of the first and second MGs into d-axis and q-axis currents based on information indicating angles of rotation which are results of detection performed by the first and second resolvers 40 and 42, and determines target currents for the respective phases such that the d-axis and q-axis currents conform to a target d-axis or q-axis current. For this reason, results of detection performed by the first and second resolvers 40 and 42 should be accurate. On the other hand, although a resolver detects a rotational position of a rotor in accordance with a phase of a current flowing through a detection coil, a deviation in the point of origin of the detected rotor position occurs due to, for example, an error in the position of attachment of the detection coil. Therefore, it is necessary to learn the point of origin by verifying a detection signal of the resolver while the motor is actually being rotated, to correct the position of the point of origin. Similarly, in an angle-of-rotation sensor that uses, for example, a Hall element, because an error in detection may occur in accordance with, for example, the position of attachment of the detection sensor, it is necessary to learn the position of the point of origin.

In some embodiments, the control unit 26 has a learning memory unit 26a. The learning memory unit 26a stores what are learned, and, when learning has been completed, the control unit 26 corrects a deviation in the points of origin of the first and second resolvers 40 and 42 in accordance with the contents stored in the learning memory unit 26a to detect the correct rotational angular position. Further, it is preferred that the learning memory unit 26a sets a flag indicating whether learning has been completed, or whether learning has yet to be completed, and the control unit 26 determines, by reference to this flag, whether or not learning has yet to be completed.

The learning of the position of the point of origin is usually performed in a factory before shipment. During or before the learning, an error in the point of origin affects the operation of the motor generator. This similarly happens when learning has yet to be completed during repair or inspection.

Through various analyses of operation performed when the learning of the point of origin has yet to be completed, the inventor found that, although the influence of incomplete learning of the point of origin is rather moderate in ordinary PWM control of the motor generator, the influence is significant in rectangular wave control. This is considered attributable to the fact that a small deviation in phase leads to a large change in amount of electric current in rectangular wave control which is selected when the output from the MG is large, compared with PMW control.

To address this situation, in some embodiments, rectangular wave control is disabled when the learning of the point of origin of an angle-of-rotation sensor has yet to be completed.

Figure 3:
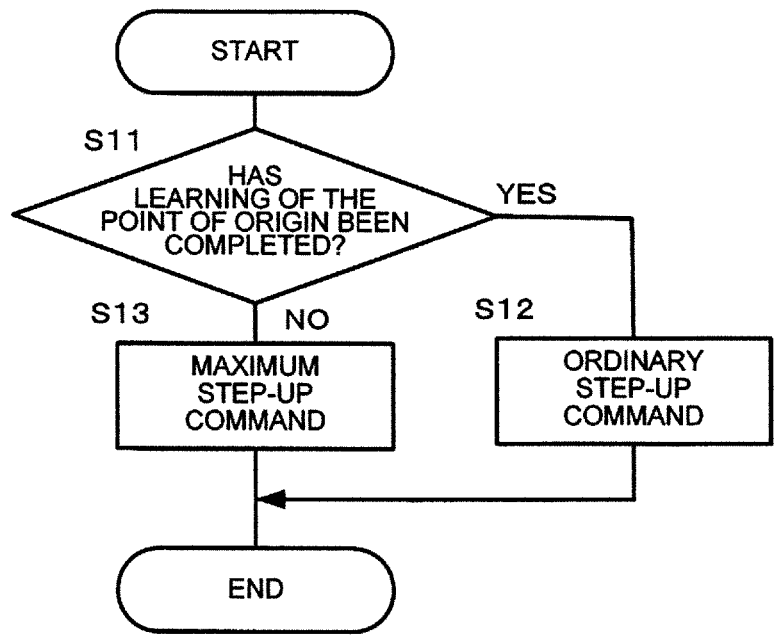
FIG. 3 is a flowchart of motor control.

FIG. 3 shows a flowchart of a process according to certain embodiments. First, it is determined whether learning of the point of origin of a resolver has yet to be completed (S11). In some embodiments, both the first and second resolvers 40 and 42 may be treated as the resolver here, and whether learning for one of the first and second resolvers 40 and 42 has yet to be completed may be determined. Alternatively, one of the first and second resolvers 40 and 42 may be treated as the resolver here. In that case, it is preferred that only the resolver 42 for the second MG 20 be treated as the resolver here.

When, in S11, it is determined that learning has been completed, an ordinary step-up command is issued (S12) to step up the voltage and operate the motor in an ordinary manner. On the other hand, when learning of the point of origin of the resolver has not been completed, a maximum voltage step-up is performed. More specifically, the step-up converter 12 steps up the voltage to a maximum, and the stepped-up voltage VH is set to a maximum value (S13).

Figure 4:
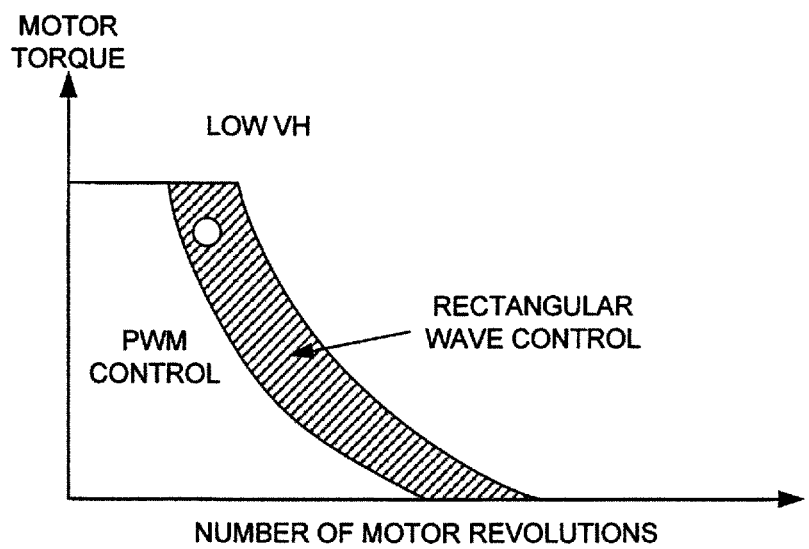
FIG. 4 illustrates a relationship of control mode with the number of motor revolutions and the motor torque at normal VH.
Figure 5:
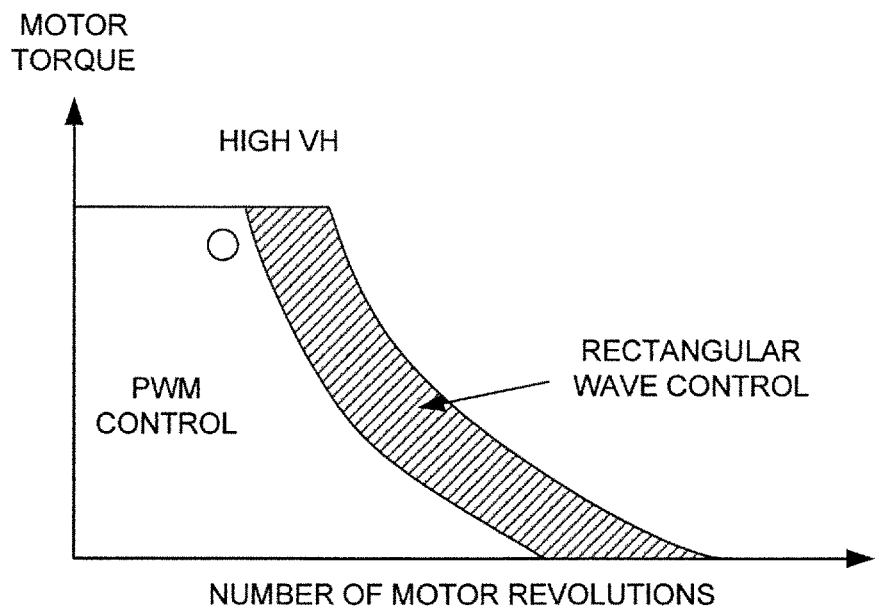
FIG. 5 illustrates a relationship of control mode with the number of motor revolutions and the motor torque at high VH.

FIG. 4 illustrates a relationship between the number of motor revolutions and the motor torque for the stepped-up voltage VH that is relatively low. The circle in FIG. 4 represents an operation condition. Under this operation condition, the motor is driven in rectangular wave control when ordinary control is applied. On the other hand, the circle in FIG. 5 represents the same operation condition for the stepped-up voltage VH that is set to a higher value. As shown, increasing the stepped-up voltage VH broadens the range over which operation can be performed in PWM control, and allows operation in PWM control under the same operation condition (the number of revolutions and torque).

As described above, in some embodiments, by performing a maximum voltage step-up in the step-up converter 12, the stepped-up voltage VH can be set to be high. This enables avoiding rectangular wave control during driving of the motor, and applying PWM control. Further, it is preferred to disable rectangular wave control. Then, when rectangular wave control is disabled, the maximum value for the motor torque at the number of motor revolutions at that time is limited, and the motor torque as requested is not obtained. However, the result is only that the maximum power becomes smaller than that in ordinary control, and no particular problem arises.

Further, although, in the above-described example, two types of control, PWM control and rectangular wave control, have been described, ordinary control mode may include, three types of control, sinusoidal wave PWM control, overmodulation PWM control, and rectangular wave control. Overmodulation PWM control is a mode of control in which the duty ratio is partially 100%, and which produces higher output than sinusoidal wave PWM control. The influence of a deviation in the point of origin of the resolver in the overmodulation PWM control is also significant, compared with sinusoidal wave PWM control. To address this situation, overmodulation PWM control may also be regarded as rectangular wave control, and disabled. Because increasing the stepped-up voltage VH broadens the range over which sinusoidal wave PWM control is performed, the starting point of overmodulation PWM control can be shifted toward a higher number of revolutions and higher torque.

Although, in some embodiments, the voltage step-up in the step-up converter 12 is a maximum voltage step-up in which the stepped-up voltage VH is set to a maximum voltage when learning of the point of origin has yet to be completed, it is also preferred to control the stepped-up voltage VH such that PWM control can be performed in accordance with the motor torque and the number of motor revolutions at that time. As a result, when PWM control is performed in ordinary operation, the stepped-up voltage VH becomes an ordinary control value.

Figure 6:
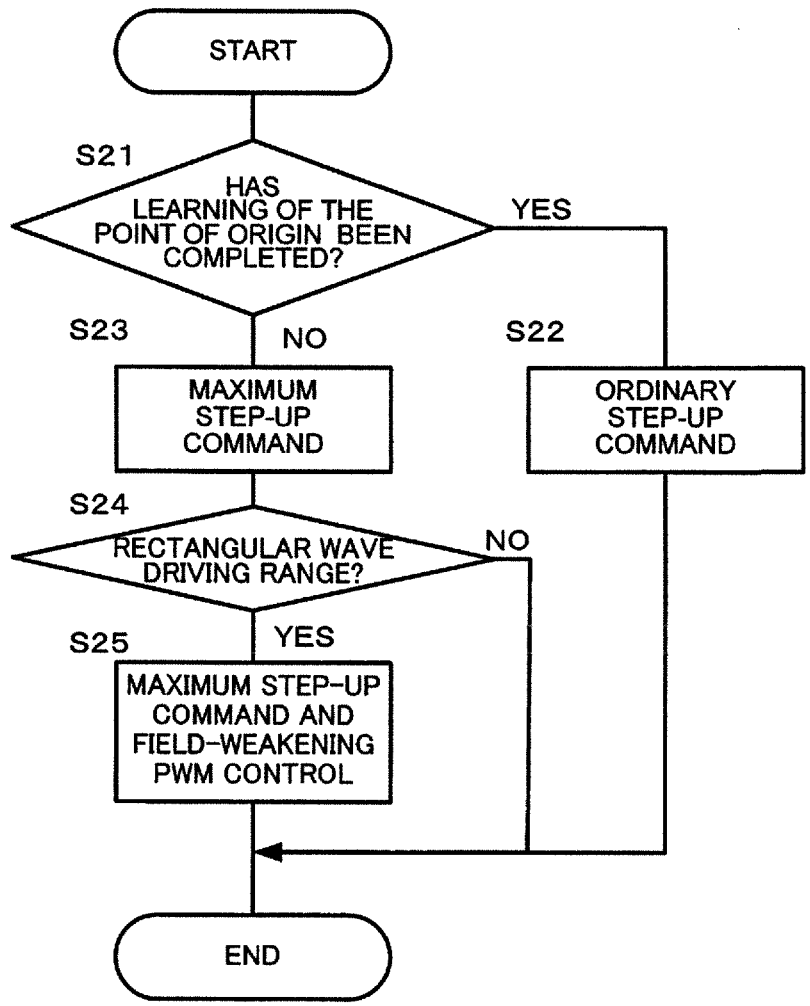
FIG. 6 is another example of a flowchart of motor control.

FIG. 6 shows a flowchart according to other embodiments. The process shown in FIG. 6 is identical to the process shown in FIG. 3 in that ordinary operation is performed when learning of the point of origin has been completed, and a maximum voltage step-up command is issued when learning of the point of origin has not been completed (S21, S22, and S23).

After the maximum step-up command is issued, it is then determined whether the operation condition at that time falls within the rectangular wave driving range after a maximum voltage step-up command is issued (S24). When the determination in S24 is YES, field-weakening PWM control is applied while the maximum voltage step-up command is being maintained (S25).

Figure 7:
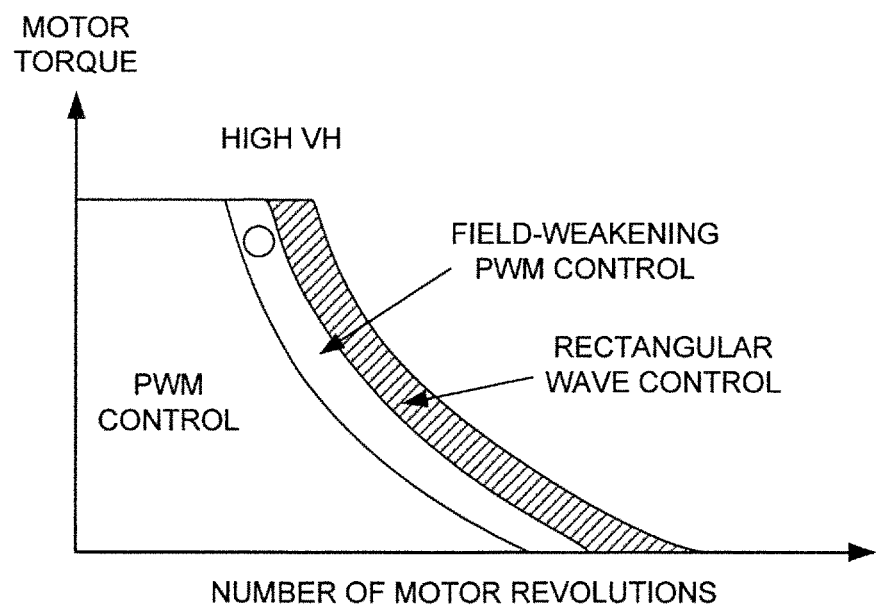
FIG. 7 illustrates another example of a relationship of control mode with the number of motor revolutions and the motor torque at high VH.

FIG. 7 illustrates a range over which field-weakening PWM control is performed. As illustrated, by performing field-weakening PWM control, rectangular wave control can be avoided when the operation condition (the number of revolutions and torque) is an operation condition under which, normally, rectangular wave control (including overmodulation PWM control) is performed. Field-weakening PWM control reduces magnetizing current, and suppresses counter electromotive force.

As described above, by performing field-weakening PWM control, the motor is driven without performing rectangular wave control in a range over which a maximum voltage step-up still cannot allow PWM control.

Also, in S25, it is preferred to disable rectangular wave control when the requested output of the motor generator is not obtained.

REFERENCE SIGNS LIST

10 BATTERY
12 STEP-UP CONVERTER
14, 16 INVERTER
18 FIRST MG
20 SECOND MG
22 POWER CONVERSION UNIT
24 ENGINE
26 CONTROL UNIT
30, 34 CAPACITOR
32 PRE-STEP-UP VOLTAGE SENSOR
36 STEPPED-UP VOLTAGE SENSOR
40, 42 RESOLVER
50, 52 SWITCHING ELEMENT
54 REACTOR

The invention claimed is:
1. A controller for a motor generator, comprising:
a battery;
a step-up converter configured to step up an output voltage from the battery;
an inverter configured to convert an output from the step-up converter into an alternating current;
a motor generator driven by the alternating current from the inverter;
an angle-of-rotation sensor configured to detect an angle of rotation of the motor generator;
a learning memory unit configured to store a result of learning of a point of origin of the angle-of-rotation sensor; and
a control unit configured to control the inverter in accordance with a target output of the motor generator and a result of detection of the angle-of-rotation sensor to control the alternating current that is to be supplied to the motor generator, and configured to control the step-up converter in accordance with the target output of the motor generator to control the output from the step-up converter,
wherein the control unit corrects the angle of rotation of the motor generator in accordance with the result stored in the learning memory unit when learning of the point of origin of the angle-of-rotation sensor has been completed, and
wherein, during operation of the motor generator, the control unit sets a voltage output from the step-up converter to be a target value which is determined in accordance with the target output of the motor generator and the corrected angle of rotation of the motor generator when learning of the point of origin of the angle-of-rotation sensor has been completed, and sets the voltage output from the step-up converter to be higher when learning of the point of origin of the angle-of-rotation sensor has yet to be completed, than when learning of the point of origin of the angle-of-rotation sensor has been completed.

2. The controller for the motor generator according to claim 1, wherein the control unit controls the step-up converter to perform a maximum voltage step-up when learning of the point of origin of the angle-of-rotation sensor has yet to be completed.

3. The controller for the motor generator according to claim 1, wherein the inverter is operated in PWM control.

4. The controller for the motor generator according to claim 2, wherein the inverter is operated in PWM control.

5. The controller for the motor generator according to claim 3, wherein the inverter is operated in field-weakening PWM control when an output from the motor generator is greater than or equal to a predetermined value.

6. The controller for the motor generator according to claim 4, wherein the inverter is operated in field-weakening PWM control when an output from the motor generator is greater than or equal to a predetermined value.

7. The controller for the motor generator according to claim 1, wherein the control unit disables rectangular wave control for the inverter when learning of the point of origin of the angle-of-rotation sensor has yet to be completed.

8. The controller for the motor generator according to claim 1, wherein:
   the learning memory unit is further configured to set a flag indicating whether learning of the point of origin of the angle-of-rotation sensor has been completed or whether learning of the point of origin of the angle-of-rotation sensor has yet to be completed; and
   the control unit is further configured to determine whether learning of the point of origin of the angle-of-rotation sensor has been completed or whether learning of the point of origin of the angle-of-rotation sensor has yet to be completed by reference to the flag.

* * * * *